Jan. 17, 1956

H. S. HARRISON 2,731,127

CONVEYOR TRANSFER MECHANISM

Filed March 11, 1950

INVENTOR.
HOMER S. HARRISON
BY
Farley Forster & Farley

ATTORNEYS

Jan. 17, 1956  H. S. HARRISON  2,731,127
CONVEYOR TRANSFER MECHANISM
Filed March 11, 1950  6 Sheets-Sheet 6

INVENTOR.
HOMER S. HARRISON
BY
*Harley Forster + Harley*
ATTORNEYS

United States Patent Office 2,731,127
Patented Jan. 17, 1956

2,731,127

CONVEYOR TRANSFER MECHANISM

Homer S. Harrison, Detroit, Mich., assignor to Allied Steel and Conveyors, Inc., Detroit, Mich., a corporation of Michigan Application March 11, 1950, Serial No. 149,056

15 Claims. (Cl. 198—20)

This invention relates to a transfer mechanism for transferring loads from one conveyor to another and comprehends a system adaptable to both continuous and intermittent discharge and receiving conveyors.

The general purpose served by such transfer mechanism is to render automatic conveyor lines more flexible in the operations which they are called upon to perform. For example, just as a machine may be most conveniently assembled by first passing through a number of subassembly stages, the functions of industrial conveyors may likewise frequently be divided into main assembly and subassembly lines. Such subdivision of conveyor lines may permit branch lines to run with intermittent travel or at speeds varying from that of the main conveyor, and may also permit a single main conveyor to service a plurality of branch lines with either the same or different production articles.

It will be understood that, while numerous combinations of main and branch conveyor lines are possible to meet various production requirements, certain aspects of a transfer mechanism may be common to a wide variety of applications. For example, in the case of transfer from one conveyor line to another, a plane intersecting both lines may contain what may be described as the transverse path of any article to be transferred between such conveyors. Such path may include either horizontal, vertical or oblique lines of travel in order to move from a given pickup point associated with the discharge conveyor to a delivery point associated with the receiving conveyor. If a mechanism is provided which is generally adaptable to any transverse path, such mechanism may be employed for any of a variety of requirements in a multitude of conveyor combinations. In the present invention, the path of movement in such transverse plane is defined by endless chains which pass over sprockets or pulleys in a manner whereby both cross and return reaches of the chain correspond generally to the path of travel required, and such chain is adapted to provide reciprocating motion by employing auxiliary single path guide tracks and links adapted to compensate for spacing between cross and return reaches of the transverse chain.

Where both discharge and receiving conveyors are of an intermittent type, movement in the transverse plane may be the only one required for a given transfer mechanism. On the other hand, where one or both of the conveyors are moving, it may be necessary or desirable to provide additional movement for the transfer mechanism in the longitudinal direction of travel of the moving conveyors. The arrangement employed in the present invention for providing such longitudinal movement utilizes the motion of the moving conveyor itself to produce a corresponding longitudinal movement in the transfer mechanism. Thus, by providing a transverse path which will move a load carrier of the transfer mechanism into the path of a member of the moving conveyor and by providing a mounting for such carrier which will accommodate movement in a longitudinal direction, the movement in transverse and longitudinal directions may be made to take place simultaneously with the longitudinal movement automatically synchronized with that of the moving conveyor. In the present embodiment, a framework is adapted to travel the transverse path between conveyors, while longitudinally extending members are provided in said framework upon which load carriers are slidably mounted.

While in some cases it may be sufficient to provide for longitudinal movement of the load carriers at the points of pickup and delivery only, as in the case of continuous conveyors running in opposite parallel directions, there may be other cases where a longitudinal component of movement is also required during the intermediate travel of load carriers between the respective conveyors. Such longitudinal movement is provided in the present embodiment by utilizing fixed oblique guide tracks adapted to engage the slidable carrier translating a portion of the transverse movement imparted to the carrier by the frame into longitudinal movement.

Wtih this arrangement a carrier of the transfer mechanism may be given a transverse movement, a simultaneous longitudinal movement opposite that of the moving conveyor it is approaching while traveling the intermediate distance between the conveyors, and a simultaneous longitudinal movement in the direction of the moving conveyor when it reaches the path of the moving conveyor. In the same manner, when the transverse movement of the frame moves the carrier away from the conveyor, a further oblique cam track may be utilized to impart a further longitudinal movement to the carrier while traversing the intermediate distance between conveyors upon its return.

Depending upon the nature of the article to be transferred, a suitable carrier pickup mechanism, such as the vacuum or mechanically actuated devices disclosed herein, may be employed. Depending again upon the nature of the artcle and the carrier mechanism employed, combinations of transverse and longitudinal movement may be adapted to bring the transfer carrier into suitable engagement with an article carried by the discharge conveyor and to deposit such article on the receiving conveyor.

An interengaging drive is employed between the conveyors and the transfer mechanism so that each conveyor carrier will be met in proper timed relationship by the carrier of the transfer mechanism.

Accordingly, it is an object of the present invention to provide a transfer mechanism adaptable for use in transferring articles from a discharging to a receiving conveyor.

Another object is to make such transfer mechanism adaptable to operate between two continuous conveyors, two intermittent conveyors or between conveyors where one runs continuously and the other intermittently.

Another object is to provide a transfer mechanism adaptable for simultaneous multiple transfer.

Another object is to provide a mechanism adaptable to travel along any required transverse path between two conveyor lines, providing movement in vertical, horizontal or oblique directions as the case may require.

Another object is to provide a transfer mechanism adapted to travel with reciprocating movement along a transverse path.

Another object is to provide mechanism for producing a longitudinal movement of the carrier mechanism while it is traveling between conveyors.

Another object is to provide mechanism for producing a synchronized longitudinal movement of transfer carrier mechanism and conveyor during the pickup and delivery operations.

Another object is to provide vacuum mechanism automatically operative to pick up an article from a discharging conveyor and to release such article at the receiving conveyor.

Another object is to provide an alternative mechanically actuated pickup mechanism.

Another object is to provide as part of the transfer mechanism means for centralizing into receiving position the carrier of the receiver conveyor.

These and other objects will be more apparent from the following detailed description of a specific embodiment of my invention, as well as from an examination of the drawings forming a part hereof, wherein.

With reference to Figs. 1 through 9, a specific embodiment is shown in which a transfer mechanism is adapted to move pairs of glass television tubes from one continuously moving single file conveyor to another intermittently moving double file conveyor and, in a subsequent stage, to retransfer pairs of television tubes from the intermittent conveyor back to the continuous conveyor.

Figure 1:
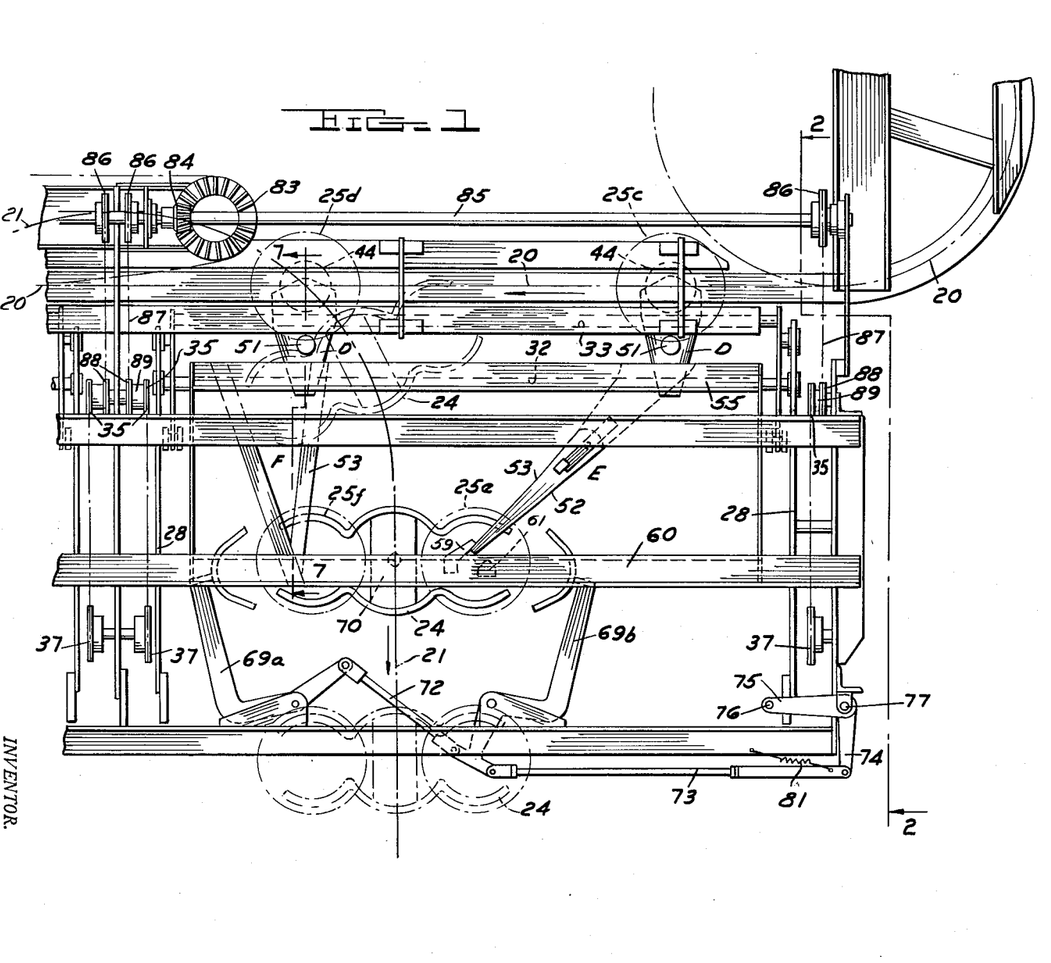
Fig. 1 is a plan view of a transfer mechanism adapted to operate between continuous and intermittent conveyors showing a portion of the mechanism adapted to transfer articles from the continuous to the intermittent conveyor.
Figure 1A:
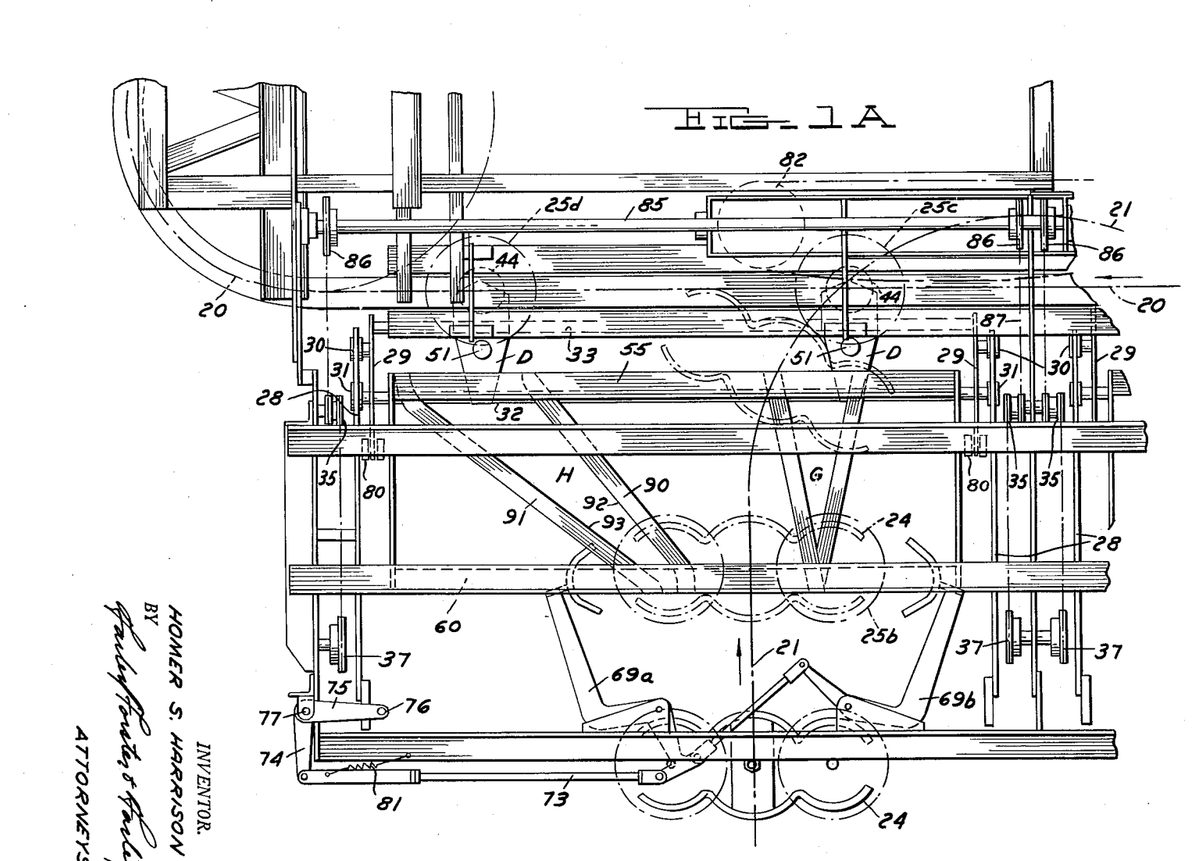
Fig. 1a is a plan view of another portion of such transfer mechanism adapted to move articles from the intermittent to the continuous conveyor.
Figure 2:
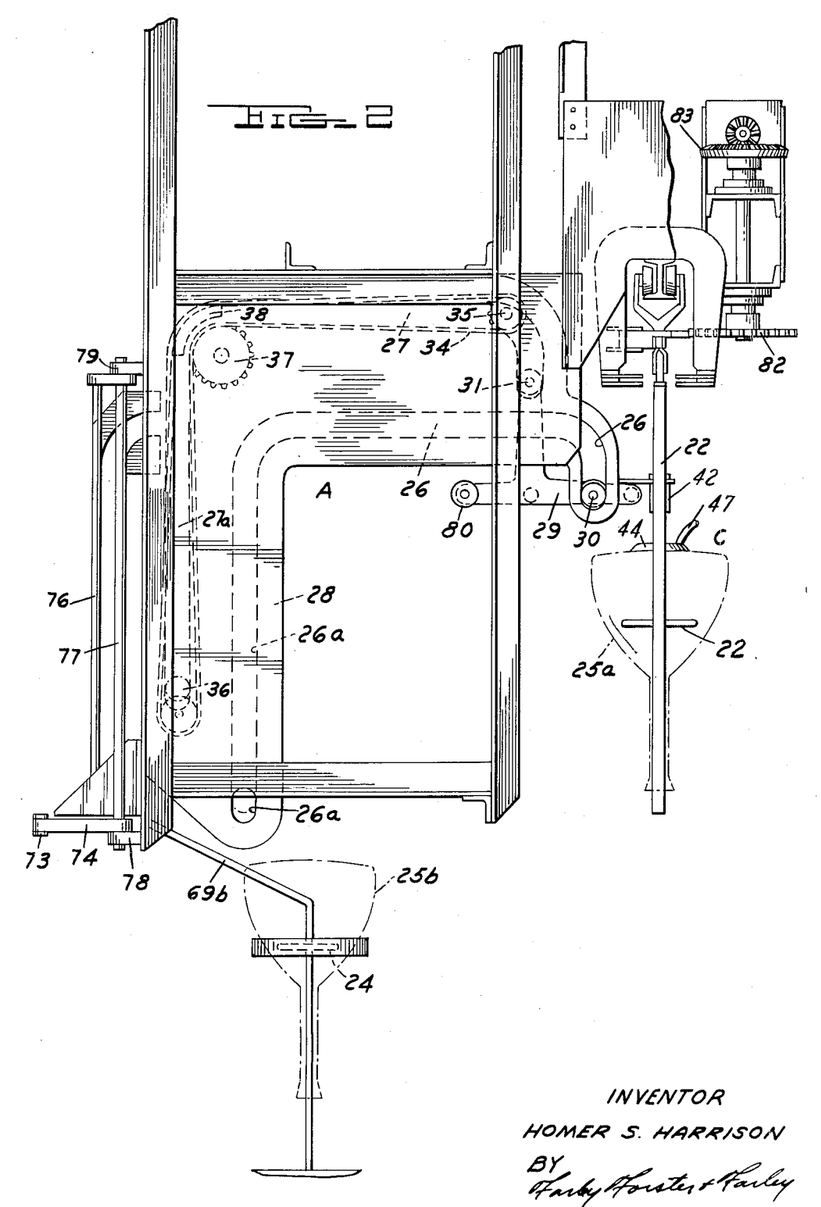
Fig. 2 is an end elevation of the transfer mechanism shown in Fig. 1.
Figures 3, 4, 5, 6:
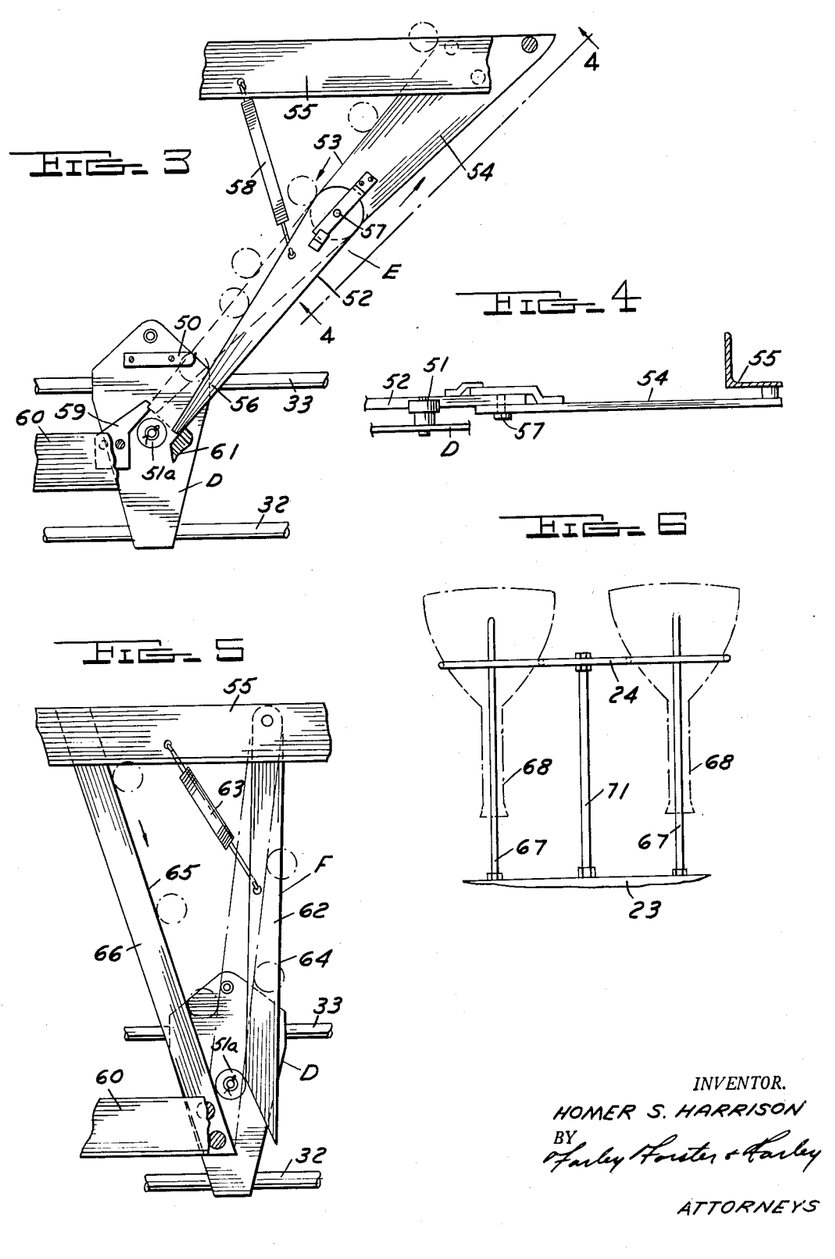
Fig. 3 is an enlarged fragmentary plan view showing the details of construction of one of the guide arms shown in Fig. 1.
Fig. 4 is a fragmentary elevation taken along the line 4—4 of Fig. 3.
Fig. 5 is an enlarged fragmentary plan view of the other guide arm shown in Fig. 1.
Fig. 6 is a side elevation of a double carrier rack employed on the intermittent conveyor.
Figures 7, 9:
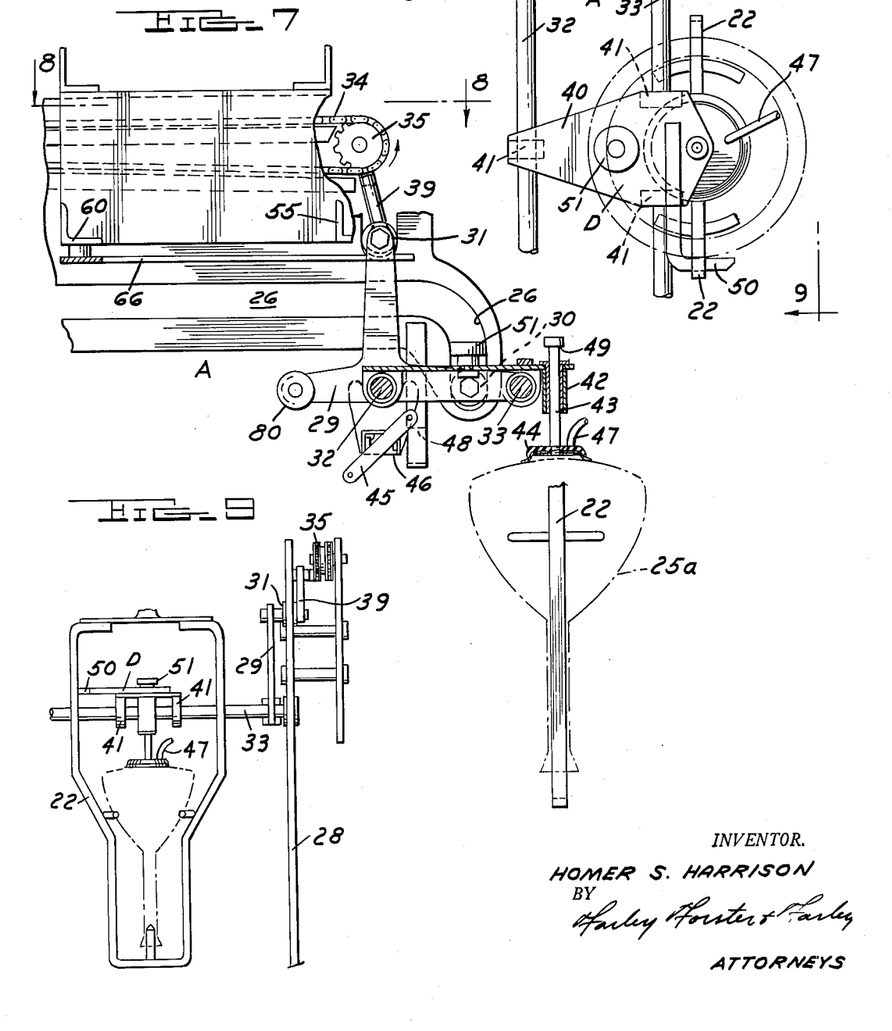
Fig. 7 is an enlarged fragmentary end elevation taken along the line 7—7 of Fig. 1.
Fig. 9 is a reduced end elevation taken along the line 9—9 of Fig. 8.
Figure 8:
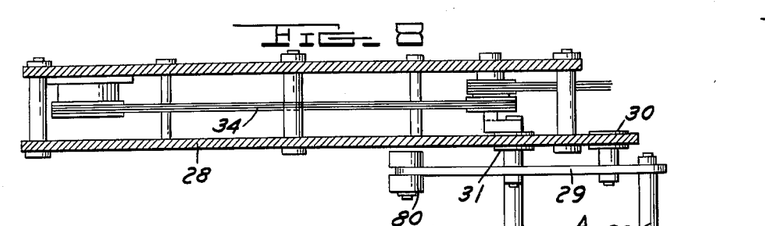
Fig. 8 is a fragmentary plan view taken along the line 8—8 of Fig. 7.

Fig. 1 shows the first stage of transfer from the continuous to the intermittent conveyor, and Fig. 1a shows the second stage transfer back to the continuous conveyor. In Fig. 1, the center line of the continuous conveyor is indicated by the broken line 20, and the direction of travel of such continuous conveyor is from right to left, while the path of the intermittent conveyor is indicated by the broken line 21 in a direction from top to bottom as seen in the drawing. The continuous conveyor is of the overhead chain driven type and carries the television tubes suspended in individual carrier racks 22, as best illustrated in Figs. 2 and 9. The intermittent conveyor, on the other hand, is of a floor chain driven pallet type, each pallet 23 being provided with a double rack 24 adapted to hold a pair of television tubes from below, as best shown in Fig. 6.

The horizontal plane of travel of the intermittent conveyor is substantially below that of the continuous conveyor and, as best shown in Fig. 2, the transfer mechanism, generally indicated as A, is located above the path of the intermittent conveyor B and laterally spaced from the path of the continuous conveyor C. The transverse path of an article moving from the continuous to the intermittent conveyor extends from a position on the continuous conveyor indicated at 25a to a position on the intermittent conveyor indicated at 25b, as shown in Fig. 2. This path is defined by a pair of parallel slots 26 and 27 in a pair of longitudinally spaced plates 28.

A movable framework for slidably mounting the transfer carriers D includes a pair of longitudinally spaced inverted T members 29, each provided with a pair of rollers 30 and 31 adapted to follow the tracks formed by slots 26 and 27 respectively and a pair of parallel shafts 32 and 33 extend between the longitudinally spaced T members 29.

A pair of longitudinally spaced transfer drive chains 34 are located just outside the plates 28 and each is adapted to pass over a drive sprocket 35, an idler sprocket 36 and pulley and guide members 37 and 38 which cause the chains to travel a path generally corresponding to the roller slots 27. As best shown in Fig. 7, a connecting link 39 between the chain 34 and the axle for the roller 31 on each of the inverted T members 29 provides a driving connection between the chain 34 and the carrier framework. Thus, it will be seen that, as the drive sprocket 35 turns in a counterclockwise direction, the carrier framework will be caused to reciprocate along the path established by the slots 26 and 27.

Each carrier D incorporates a plate 40 having three bushings 41 which provide sliding connections with the shafts 32 and 33. At the outer end of the plate, a vertical bushing 42 is provided which accommodates a slidable plunger 43 carrying at its lower end a rubber suction cup 44. A rocker arm 45 carried by the T member 29 controls a three-way vacuum valve 46 which in turn communicates with a source of vacuum, not shown, an atmospheric pressure inlet, and with each of the vacuum cups through connections 47. As the T member 29 moves down toward the end of its travel, as shown in Fig. 7, the rocker arm 45 contacts a stationary bracket 48 moving the rocker arm 45 to a position for connecting the vaccum supply with suction cup 44 and, as the T member 29 moves upwardly, the rocker arm 45 remains in a "vacuum on" position. When the stop 49 contacts the bushing 42, further upward travel raises the tubes 25a out of the conveyor rack 22.

In order to synchronize longitudinal movement of the transfer carrier D with the continuous conveyor C during the pickup operation, an arm 50 is provided on the carrier D in a position where it will be engaged by the rack 22 of the continuous conveyor C, thereby causing the carrier D to slide along the shafts 32 and 33 during that portion of the transfer mechanism's travel wherein the suction cup 44 is moving downwardly into registration with the tube 25a and raising the same out of the rack 22. As soon as the horizontal travel of the carrier D is sufficient to move the arm 50 out of engagement with the rack 22, such driving engagement is discontinued and the further longitudinal travel of the carrier D is controlled by other means now to be described.

With reference to Fig. 1, it will be seen that each transfer operation requires that a pair of tubes be moved in a horizontal plane from the moving positions indicated at 25c and 25d on equally spaced carriers of the continuous conveyor C to the stationary positions on the intermittent carrier B indicated at 25e and 25f respectively. Thus, it will be seen that a somewhat triangular path is required for each carrier D with the motion corresponding to the short leg of the triangle being furnished by the continuous conveyor C itself. In order to convert the transverse motion of the carrier framework to cause the path of each carrier D to conform to the other two legs of the triangle, transverse guide members generally indicated as E and F are provided in a horizontal plane at a level just above the plates 40 of the carriers D in a position to be contacted by a roller 51 mounted on a vertical axis on top of each plate 40 whenever the carrier framework is traveling along the horizontal portion of the transverse path established by slots 26 and 27. When an empty carrier D is traveling between positions 25e and 25c, the roller 51 will travel along the right-hand edge 52 of the guide member E and, after picking up a tube, will return with the roller 51 traveling along the left-hand edge 53. Detailed construction of the guide member E is shown in Fig. 3 and its manner of operation may best be understood with reference to such figure. The guide member E consists of one rigid portion 54 anchored to frame member 55 and a movable end portion 56 pivotally connected at 57 to the outer end of member 54. A tension spring 58 normally holds the end 56 against a stop 59 connected to frame member 60 and the movable arm 56 registers against such stop during all portions of the travel of an empty carrier D from positions 25e to 25c, with the roller 51 registering against the edge 52.

After the arm 50 of the carrier D becomes disengaged from the continuous conveyor rack 22, its roller 51 will contact and move progressively along the left-hand edge 53 of the guide members 54 and 56. After the roller 51 passes the pivot point 57 and moves progressively further along the movable arm 56, the resistance of the carrier D in sliding along the shafts 32 and 33 acts on an increasing moment arm finally overcoming the tension in spring 58 causing the arm 56 to move over against stop 61, whereupon the roller 51 will be free to enter between the stop 59 and the end of the arm 56 to the position shown at 51a. Continued travel of the carrier framework will now move the carrier D in a transverse direction with no longitudinal component and the arm 56 will be free to return into registration with the stop 59.

The operation of the guide arms F in providing longitudinal movement conforming to the triangular path of a carrier D moving between positions 25f and 25b may be seen from an examination of Fig. 5. Here pivoted arm 62 is normally held in its dotted line position by tension spring 63 and, in traveling from position 25f to 25b, the carrier roller moves along the right-hand edge 64 of the arm 62. After the pickup operation and the disengagement of the carrier arm 50 with the continuous conveyor rack 22, the carrier roller contacts the right-hand edge 65 of a fixed guide member 66 and eventually moves the pivoted arm 62 to an open position, as shown in full line in Fig. 5.

When the horizontal travel of the framework for the carriers D is completed and such framework starts down the vertical path defined by vertical portions 26a and 27a of the slots 26 and 27, the tubes are in a position directly over a receiving pallet 23 (see Fig. 6) of the intermittent conveyor B. As shown in Fig. 6, small diameter pipes 67 are required to pass through the necked portions 68 of the television tubes, for certain subsequent process operations, and it is accordingly necessary that the pallet 23 be accurately aligned in correct receiving position under the transfer mechanism during the time that the television tubes are lowered into position. In order to accomplish such accurate alignment, clamp arms 69a and 69b pivotally mounted on the framework of the transfer mechanism are provided to engage the ends of the rack member 24 and, through the rigid connections of a central plate 70 and shaft 71, centralize the pallet 23 into proper receiving position. The arms 69a and 69b are simultaneously actuated by linkage members 72 and 73 from a bell crank arm 74. The other actuating arm 75 of the bell crank assembly includes a pair of vertical shafts 76 and 77 which are substantially coextensive in length with the vertical travel of the carrier framework in the slots 26a and 27a. The shaft 77 which is pivotally connected to stationary brackets 78 and 79 forms the pivotal axis of the bell crank assembly while the shaft 76 is contacted by a roller 80 journaled on the end of one inverted T member 29. The shaft 76 is actuated to rotate the bell crank arms 75 and 74 and close the clamp arms 69a and 69b in response to the transverse movement of the roller 80, and the continuing contact of the roller 80 with the shaft 76 throughout the vertical travel of the carrier framework continues to hold the clamp arm 69a and 69b in a closed position throughout the delivery operation. A suitable spring 81 is provided to return the clamp arms 69a and 69b to their open position as soon as the roller 80 moves transversely away from the bell crank assembly.

The actuating arm 45 of the vacuum valve 46 is adapted to contact a stationary frame member during the last portion of its downward travel in the delivery operation, thereby moving the valve 46 to a "vacuum release" position where it remains throughout the return cycle until it once again contacts the bracket 44 during the pickup operation.

As shown in Figs. 1 and 2, a common drive is provided for the endless conveyor C and transfer mechanism A. The continuous conveyor drive sprocket 82 and the gear 83 are driven by a common shaft, the latter gear driving a bevel gear 84, shaft 85, end sprockets 86, chains 87, stub shafts 89 and transfer chain sprockets 35.

In summary, it will be seen that the inverted T members 29 and longitudinal shafts 32 and 33 extending therebetween travel a transverse path defined by slots 26 and 27, with power provided by the continuously moving transfer drive chain 34, while the movement of the carrier units D is a combination of the transverse movement of the shaft members 32 and 33, and the longitudinal movements imparted by guide tracks E and F, as well as by the continuous conveyor racks 22; also that all other auxiliary or control movements of the transfer mechanism, including the clamping arms 69a and 69b and the valve actuating arm 45 are derived from the movement of the drive chain 34 which is synchronized with that of the continuous conveyor.

It will be understood that further means, not shown, are provided for synchronizing the drive of the intermittent conveyor with that of the continuous conveyor.

In Fig. 1a, the remaining portion of the transfer mechanism for returning tubes from the intermittent conveyor back to the continuous conveyor is shown. Such mechanism is almost identical to that already described, with the exception that the vacuum valve is adapted to operate in reverse in order to establish effective pickup vacuum at the intermittent conveyor and to release such vacuum at the continuous conveyor. Guide members G and H for imparting horizontal movement to the carriers D during their horizontal travel differ somewhat from the guide members E and F in a manner conforming to the relative location of the discharging pallets and the receiving continuous conveyor carriers. The operation of the guide G is identical to that of the guide F, while the guide H incorporates two fixed guide rails 90 and 91 positioned for a carrier roller 51 to track along the inner faces 92 and 93 of such guide members.

Figure 10:
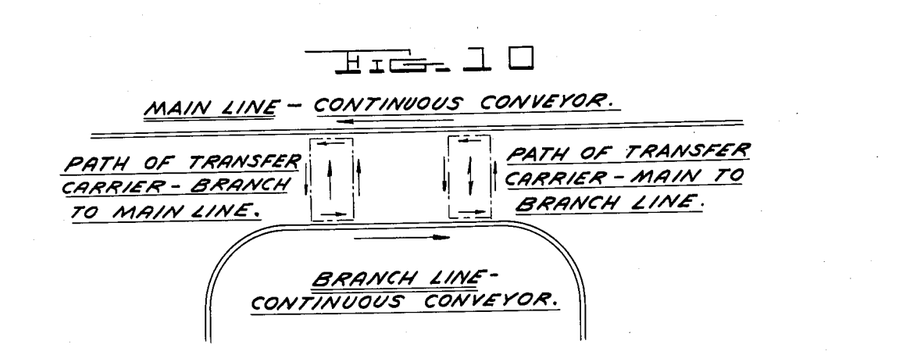
Fig. 10 is a schematic diagram showing the paths of the transfer carriage in a modified system for transferring loads between two continuous conveyors.

It will be readily understood from an examination of the modified arrangement shown schematically in Fig. 10 that, where a transfer is to be made between two continuous conveyors moving at equal speeds in opposite directions at the point of transfer, longitudinal movement of the transfer carriers may be limited to that imparted by the continuous conveyors, and guide members E and H may be completely omitted.

Figure 11:
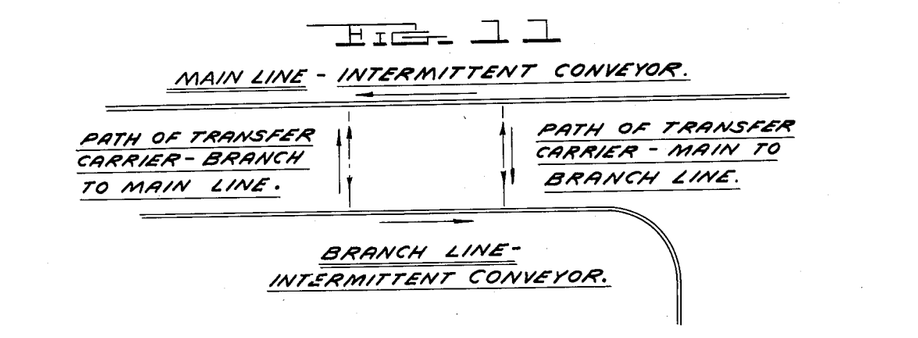
Fig. 11 is a schematic diagram showing the paths of the transfer carriers in a modified system for transferring loads between two intermittent conveyors.

As will be further understood from Fig. 11, in the case of a transfer between two intermittent conveyors where each is stationary during the pickup and delivery operations, longitudinal movement of the transfer carriers D may be entirely dispensed with and the transfer movement limited entirely to a single transverse path for each transfer operation.

Figure 12:
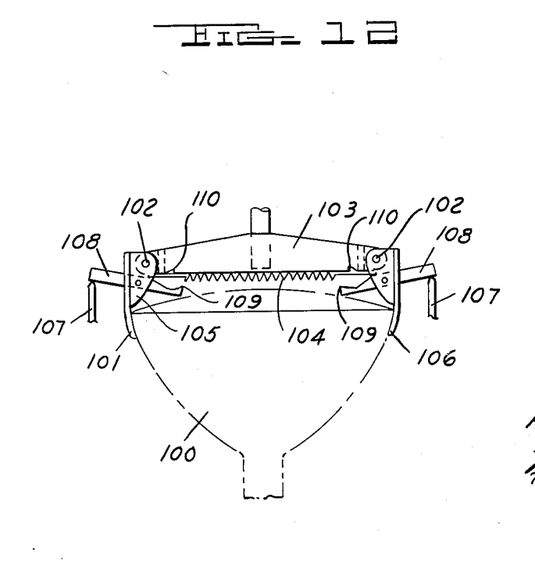
Fig. 12 is a side elevation of an alternative mechanically actuated pickup mechanism.

In Fig. 12, an alternative mechanically actuated pickup mechanism is illustrated. In this device, a load 100 is engaged by a pair of arms 101 pivoted at 102 to a cross head 103. The arms 101 may be gravity actuated to engage the load or actuated by a spring such as 104, depending on the nature of the load. When the load is deposited on a receiving rack, a slight continued lowering of the cross head 103 causes cam surfaces 105 on the arms 101 to engage the outer edge of the load to move the lower ends 106 out of engagement. In the absence of fixed stop members 107, located only at the pickup stations, pivoted levers 108 will rotate by gravity to cause ends 109 to engage notches 110 thereby holding arms 101 in an outward release position while the carrier moves to a pickup station. At the pickup station the fixed stop members 107 engage levers 108, releasing their engagement with notches 110 thereby permitting the arms 101 to move by gravity or spring 104 to engage the load 100 for the transfer operation.

While a specific application and particular embodiment of my invention have been disclosed herein in detail, it will be understood that numerous modifications in particular constructional features may be resorted to without departing from the scope of my invention as defined in the following claims.

I claim:

1. A mechanism for transferring articles between separate conveyors, at least one of which is continuously moving, characterized by a longitudinally extending framework adapted to move in a transverse path between said conveyors, a transfer carrier mounted on said framework for slidable movement in a longitudinal direction, and members on said continuously moving conveyor adapted to engage said transfer carrier for imparting longitudinal movement thereto when it is in the path of said conveyor.

2. A mechanism for transferring articles between separate conveyors, characterized by a longitudinally extending framework adapted to move in a transverse path between said conveyors, a transfer carrier mounted on said frame for slidable movement in a longitudinal direction, and an oblique guide mounted on a stationary member adapted to engage said carrier and convert a portion of its transverse movement into longitudinal movement in a manner whereby said carrier may be made to meet one of said conveyors at a point longitudinally spaced from that at which it leaves the other of said conveyors, said carrier being adapted to engage an article carried by one conveyor and transfer it to the other conveyor.

3. A mechanism for transferring articles between separate conveyors, at least one of which is continuously moving, characterized by a longitudinally extending frame adapted to move in a transverse path between said conveyors, a transfer carrier mounted on said frame for slidable movement in a longitudinal direction, an oblique guide anchored to a stationary member adapted to engage said carrier and convert a portion of its transverse movement into longitudinal movement while said carrier is traveling between said conveyors, and members on said continuously moving conveyor adapted to engage said carrier when it reaches the path of said conveyor and to impart longitudinal movement thereto, said carrier being adapted to engage an article carried by one conveyor and transfer it to the other conveyor.

4. A mechanism for transferring articles between separate conveyors characterized by a longitudinally extending frame adapted to move in a transverse path between said conveyors, a pair of longitudinally spaced cam members adapted to engage the ends of said frame and to define said transverse path, a transfer carrier mounted on said frame for slidable movement in a longitudinal direction, and an oblique guide anchored to a stationary member adapted to engage said carrier and convert a portion of its transverse movement into longitudinal movement, said carrier being adapted to engage an article carried by one conveyor and transfer it to the other conveyor.

5. A mechanism for transferring articles between separate conveyors, at least one of which is continuously moving, characterized by a longitudinally extending frame adapted to move in a transverse path between said conveyors, longitudinally spaced cam members adapted to engage the ends of said frame and define said transverse path, a transfer carrier mounted on said frame for slidable movement in a longitudinal direction, and members carried by said moving conveyor adapted to engage said carrier when it reaches the path of said conveyor and to impart longitudinal movement thereto.

6. A mechanism for transferring articles between separate conveyors, at least one of which is continuously moving, characterized by a longitudinally extending frame adapted to move in a transverse path between said conveyor, longitudinally spaced cam members adapted to engage the ends of said frame and to define said transverse path, a transfer carrier mounted on said frame for slidable movement in a longitudinal direction, an oblique guide anchored to a stationary member adapted to engage said carrier during its travel between said conveyors and to convert a portion of its transverse movement into longitudinal movement, and members carried by said moving conveyor adapted to engage said carrier when it reaches the path of said conveyor and to impart longitudinal movement thereto, said carrier being adapted to engage an article carried by one conveyor and transfer it to the other conveyor.

7. A mechanism for transferring articles between separate conveyors, at least one of which is continuously moving, characterized by a longitudinally extending frame adapted to move in a transverse path between said conveyors, longitudinally spaced cam members adapted to engage the ends of said frame and define said transverse path, an endless chain drive adapted to move said frame in the path defined by said cam members, a transfer carrier mounted on said frame for slidable movement in a longitudinal direction, an oblique guide anchored to a stationary member adapted to engage said carrier during its travel between said conveyors and to convert a portion of its transverse movement into longitudinal movement, and members carried by said moving conveyor adapted to engage said carrier when it reaches the path of said conveyor and to impart longitudinal movement thereto, said carrier being adapted to engage an article carried by one conveyor and transfer it to the other conveyor.

8. A mechanism for automatically picking up, transporting and depositing articles from one conveyor to another, characterized by a transfer carrier, cam track means having two vertical components joined by a horizontal component for defining a transverse path of movement for said carrier between said conveyors appropriate to said picking up and depositing operations, an endless drive chain adapted to move in a path generally conforming to said transverse path defined by said cam means, and a drive link extending between said drive chain and a member of the carrier following the path of said cam means adapted to compensate for variations in the respective paths.

9. A mechanism for automatically picking up, transporting and depositing articles from one conveyor to another, characterized by a longitudinally extending frame adapted to move in a transverse path between said conveyors appropriate to said picking up and depositing operations, a pair of longitudinally spaced cam members having two vertical components joined by a horizontal component adapted to engage the ends of said frame to define said transverse path of movement, an endless chain drive adjacent to each of said cam members adapted to conform generally to the transverse path of movement defined by said cam members, and a drive link extending from each of said chains to one end of said frame adapted to move said frame along said transverse path and to compensate for variations in the paths of said cam members and said drive chains.

10. A mechanism for transferring uniformly spaced articles between separate endless conveyors, at least one of which is moving continuously, comprising a transfer carrier, means synchronized with conveyor movement adapted to provide said carrier with reciprocating movement transversely between said conveyors, mechanism associated with said carrier adapted to engage an article on one conveyor and to deliver the same to the other conveyor, and mechanism for imparting longitudinal movement to said carrier corresponding to that of said moving conveyor while said carrier is in the path of said moving conveyor.

11. A mechanism for transferring articles between separate conveyors, one of which travels continuously and the other intermittently, comprising a longitudinally extending frame adapted to move in a transverse path between said conveyors, a transfer carrier mounted on said frame for slidable movement in a longitudinal direction and mechanism adapted to move said carrier longitudinally on said frame during the transverse movement thereof in a manner whereby said carrier will approach and leave a single longitudinal position adjacent said intermittent conveyor and will travel longitudinally with said moving conveyor while it is in the path thereof.

12. A mechanism for transferring uniformly spaced articles between separate endless conveyors, each of which is moving continuously in opposite parallel directions at the point of transfer, comprising longitudinally extending framework, means synchronized with conveyor movement adapted to provide said carrier with reciprocating movement in a transverse path between said conveyors, a transfer carrier mounted on said frame for slidable movement in a longitudinal direction, and mechanism for imparting longitudinal movement corresponding to that of each moving conveyor while said carrier is in the path thereof.

13. A mechanism for transferring articles between separate conveyors, at least one of which travels intermittently and is stationary at the moment of transfer, characterized by a transfer carrier adapted to travel with reciprocating movement along a transverse path between said conveyors, a carrier on said intermittent conveyor adapted to hold articles handled by said transfer mechanism, and mechanism responsive to the approach of said transfer carrier to said conveyor carrier adapted to engage and centralize said conveyor carrier for accurate alignment with said transfer mechanism during the transfer therebetween.

14. A mechanism for transferring articles between separate conveyors, comprising a transfer carrier adapted to reciprocate along a transverse path between said conveyors, vertical components at the ends of said path located above the respective pickup and delivery points, endless chain means for effecting transfer carrier reciprocating movement along said transverse and vertical components mechanism actuated to engage an article in response to the lowering of said carrier over a pickup point, and mechanism actuated to disengage said article in response to the lowering of said carrier over a delivery point.

15. A mechanism for transferring articles between separate conveyors, comprising a transfer carrier adapted to reciprocate along a transverse path between said conveyors, vertical components at the ends of said path located above the respective pickup and delivery points, mechanism including a pair of pivoted arms for engaging an article and means for urging said arms toward an engaging position rendered operative by the lowering of said carrier over a pickup point, means for urging said arms to a disengaging position responsive to the lowering of said carrier over a delivery point, and means for holding said arms in said disengaging position during the return of said carrier to said pickup point.

References Cited in the file of this patent

UNITED STATES PATENTS

| | | |
|---|---|---|
| 1,105,271 | Hall | July 28, 1914 |
| 1,474,619 | Buck | Nov. 20, 1923 |
| 1,621,301 | Wright | Mar. 15, 1927 |
| 1,906,604 | Hutchinson | May 2, 1933 |
| 1,943,483 | Miller | Jan. 16, 1934 |
| 1,951,400 | Dvorak | Mar. 20, 1934 |
| 1,983,593 | Beeson et al. | Dec. 11, 1934 |
| 2,008,960 | Lampard | July 23, 1935 |
| 2,301,892 | Lewis | Nov. 10, 1942 |
| 2,364,868 | Monroe | Dec. 12, 1944 |
| 2,381,502 | Lang | Aug. 7, 1945 |
| 2,541,809 | Clark | Feb. 13, 1951 |